(12) United States Patent
Tamura

(10) Patent No.: US 9,304,728 B2
(45) Date of Patent: Apr. 5, 2016

(54) GENERATING A MAP OF IMAGE FORMING DEVICES ON A MOBILE DEVICE

(71) Applicant: KYOCERA Document Solutions Inc., Osaka-shi, Osaka (JP)

(72) Inventor: Takashi Tamura, Osaka (JP)

(73) Assignee: KYOCERA Document Solutions Inc., Osaka-shi (JP)

( * ) Notice: Subject to any disclaimer, the term of this patent is extended or adjusted under 35 U.S.C. 154(b) by 0 days.

(21) Appl. No.: 14/463,471

(22) Filed: Aug. 19, 2014

(65) Prior Publication Data

US 2015/0062629 A1   Mar. 5, 2015

(30) Foreign Application Priority Data

Aug. 28, 2013   (JP) ................................. 2013-177256

(51) Int. Cl.
| | |
|---|---|
| *G06F 3/12* | (2006.01) |
| *H04N 1/00* | (2006.01) |
| *H04N 1/32* | (2006.01) |

(52) U.S. Cl.
CPC .......... *G06F 3/1292* (2013.01); *H04N 1/00307* (2013.01); *H04N 1/32117* (2013.01); *H04N 2201/0094* (2013.01); *H04N 2201/3253* (2013.01); *H04N 2201/3278* (2013.01)

(58) Field of Classification Search
CPC .................. H04N 1/00493; H04N 2201/3253; H04N 2201/0094; G06F 19/708; G06F 19/26; G06F 3/1292
USPC ........................................................ 358/1.15
See application file for complete search history.

(56) References Cited

U.S. PATENT DOCUMENTS

| | | | |
|---|---|---|---|
| 2001/0052995 | A1 | 12/2001 | Idehara |
| 2005/0086282 | A1* | 4/2005 | Anderson et al. ............. 709/200 |
| 2011/0310087 | A1* | 12/2011 | Wright et al. ................. 345/419 |
| 2012/0019867 | A1* | 1/2012 | Prati et al. .................... 358/1.15 |

(Continued)

FOREIGN PATENT DOCUMENTS

| | | | |
|---|---|---|---|
| JP | 10319795 A | 12/1998 | |
| JP | 11334180 A | 12/1999 | |

(Continued)

OTHER PUBLICATIONS

English language machine translation of JP 2002-082866 to Enomoto.*

*Primary Examiner* — Eric A Rust
(74) *Attorney, Agent, or Firm* — Alleman Hall McCoy Russell & Tuttle LLP

(57) ABSTRACT

In an image forming system, a map image generation portion obtains positional information of image forming apparatuses having been detected, from the image forming apparatuses having been detected, and generates a map image that indicates, by disposing device icons representing the image forming apparatuses having been detected, a distance and a direction of each image forming apparatus having been detected, relative to a present position and a present orientation of a mobile terminal apparatus, based on the present position and the present orientation of the mobile terminal apparatus and the positional information of the image forming apparatuses having been detected. An output instruction portion transmits an output instruction, to the image forming apparatus corresponding to a device icon selected from among the device icons in the map image displayed on a display device.

11 Claims, 13 Drawing Sheets

(56) References Cited

U.S. PATENT DOCUMENTS

| | | | |
|---|---|---|---|
| 2012/0162687 A1* | 6/2012 | Hattori | 358/1.13 |
| 2013/0194626 A1* | 8/2013 | Sakurai | 358/1.15 |
| 2014/0098249 A1* | 4/2014 | Park | 348/207.2 |
| 2014/0320926 A1* | 10/2014 | Sato | 358/1.15 |

FOREIGN PATENT DOCUMENTS

| | | | |
|---|---|---|---|
| JP | 2002-082866 | * | 3/2002 |
| JP | 2004222202 A | | 8/2004 |
| JP | 2005184444 A | | 7/2005 |
| JP | 2012217126 A | | 11/2012 |

* cited by examiner

GENERATING A MAP OF IMAGE FORMING DEVICES ON A MOBILE DEVICE

INCORPORATION BY REFERENCE

This application is based upon and claims the benefit of priority from the corresponding Japanese Patent Application No. 2013-177256 filed on Aug. 28, 2013, the entire contents of which are incorporated herein by reference.

BACKGROUND

The present disclosure relates to image forming systems and computer-readable storage mediums.

In a system in which an output instruction such as an instruction for printing can be issued from a terminal apparatus of a user to an image forming apparatus, the user needs to select, for the terminal apparatus, an image forming apparatus to which the output instruction is to be issued.

In some image forming apparatuses, icons representing input devices such as a scanner and output devices such as a plotter are displayed on an operation portion, and a user drags and drops a document icon onto the icon representing any of the output devices, to select the output device.

In some systems, a layout diagram indicating positions at which a plurality of output devices are disposed is previously generated, the layout diagram is displayed, and a user designates an output device among the plurality of output devices in the layout diagram, to select the output device.

In other image forming apparatuses, a plurality of devices over a network are displayed so as to represent a tree-like structure.

SUMMARY

An image forming system according to one aspect of the present disclosure includes: one or plural image forming apparatuses; and a mobile terminal apparatus configured to transmit an output instruction to any of the one or plural image forming apparatuses. Each image forming apparatus transmits, when receiving, from the mobile terminal apparatus, a request for transmitting positional information of the image forming apparatus, the positional information of the image forming apparatus to the mobile terminal apparatus. The mobile terminal apparatus includes: a display device; a position detection device; a direction detection device; a wireless communication device; a device detection portion; a map image generation portion; and an output instruction portion. The position detection device is configured to detect a present position of the mobile terminal apparatus. The direction detection device is configured to detect a present orientation of the mobile terminal apparatus. The device detection portion is configured to detect the image forming apparatuses that can be used, by using the wireless communication device. The map image generation portion is configured to obtain the positional information of the image forming apparatuses having been detected, from the image forming apparatuses having been detected, and generate a map image that indicates, by disposing device icons representing the image forming apparatuses having been detected, a distance and a direction of each image forming apparatus having been detected, relative to the present position and the present orientation of the mobile terminal apparatus, based on the present position and the present orientation of the mobile terminal apparatus and the positional information of the image forming apparatuses having been detected. The output instruction portion is configured to transmit the output instruction, to the image forming apparatus corresponding to a device icon selected from among the device icons in the map image displayed on the display device.

A computer-readable storage medium according to another aspect of the present disclosure is a computer-readable storage medium having stored therein an output instruction program by which a computer in a mobile terminal apparatus that includes: a display device; a position detection device configured to detect a present position; a direction detection device configured to detect a present orientation; and a wireless communication device, and that transmits an output instruction to image forming apparatuses, is caused to function as: a device detection portion; a map image generation portion; and an output instruction portion. The device detection portion is configured to detect the image forming apparatuses that can be used, by using the wireless communication device. The map image generation portion is configured to obtain positional information of the image forming apparatuses having been detected, from the image forming apparatuses having been detected, and generate a map image that indicates, by disposing device icons representing the image forming apparatuses having been detected, a distance and a direction of each image forming apparatus having been detected, relative to the present position and the present orientation of the mobile terminal apparatus, based on the present position and the present orientation of the mobile terminal apparatus and the positional information of the image forming apparatuses having been detected. The output instruction portion is configured to transmit the output instruction, to the image forming apparatus corresponding to a device icon selected from among the device icons in the map image displayed on the display device.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, embodiments of the present disclosure will be described with reference to the drawings.

Embodiment 1

Figure 1:
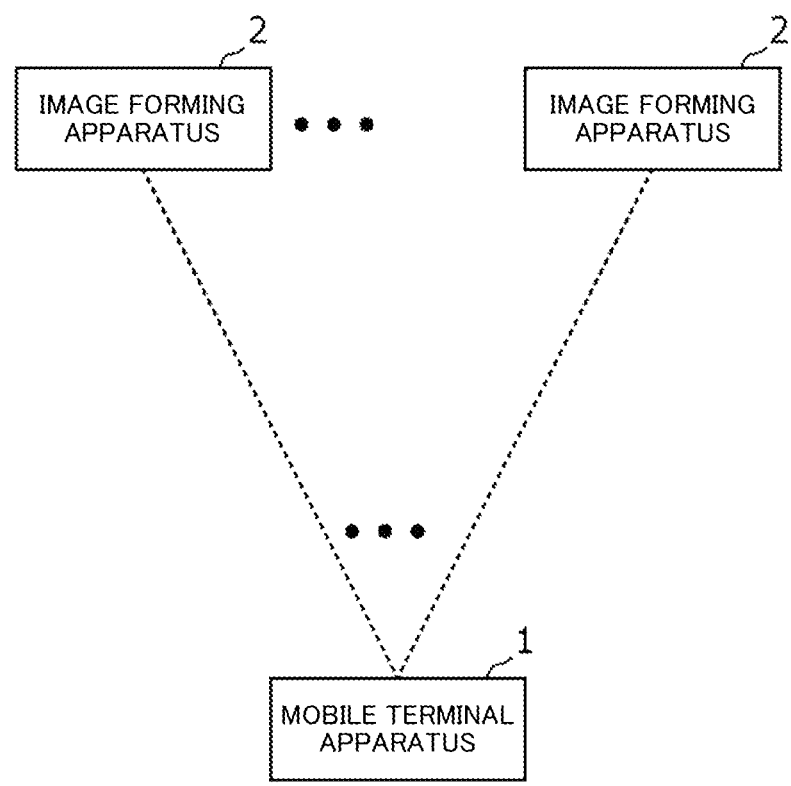
FIG. 1 is a block diagram illustrating a configuration of an image forming system according to embodiments of the present disclosure.

FIG. 1 is a block diagram illustrating a configuration of an image forming system according to the embodiments of the present disclosure. In the system shown in FIG. 1, a mobile terminal apparatus 1 such as a smartphone is connectable to one or plural image forming apparatuses 2 by wireless communication such as a wireless LAN (Local Area Network) or the Bluetooth (registered trademark), and is allowed to transmit, by the wireless communication, an output instruction such as a request for printing or a request for transmission by a facsimile, to the image forming apparatus 2 selected by a user. The image forming apparatus 2 has an image output function such as a function of a printer, a facsimile machine, or a multifunction peripheral, outputs (for example, prints or transmits) an image based on the output instruction from the mobile terminal apparatus 1 by using the image output function, and transmits, when receiving, from the mobile terminal apparatus 1, a request for transmitting positional information of the image forming apparatus 2, the positional information of the image forming apparatus 2 to the mobile terminal apparatus 1.

Figure 2:
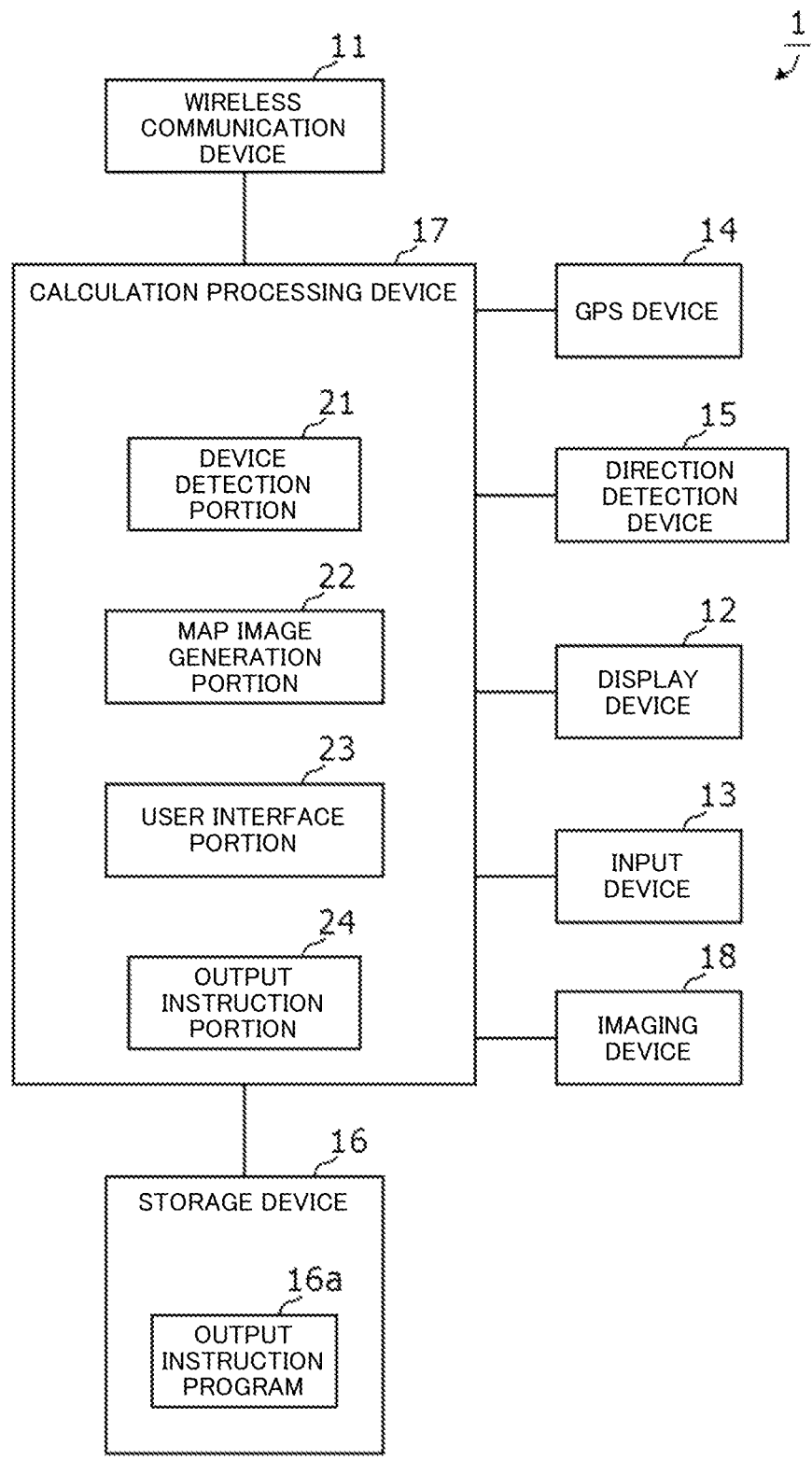
FIG. 2 is a block diagram illustrating a configuration of a mobile terminal apparatus 1 shown in FIG. 1.

FIG. 2 is a block diagram illustrating a configuration of the mobile terminal apparatus 1 shown in FIG. 1.

The mobile terminal apparatus 1 includes a wireless communication device 11, a display device 12, an input device 13, a GPS device 14, a direction detection device 15, a storage device 16, a calculation processing device 17, and an imaging device 18.

The wireless communication device 11 is, for example, a wireless LAN interface, is implemented as a communication circuit in compliance with a predetermined wireless communication standard, and directly or indirectly communicates with the image forming apparatus 2.

The display device 12 is a device such as a liquid crystal display disposed in a casing of the mobile terminal apparatus 1, and displays various screens to a user.

The input device 13 is a device, such as a touch panel disposed on the display device 12, which detects a user's operation.

The GPS device 14 is a GPS (Global Positioning System), and identifies an absolute position (latitude, longitude, and altitude) of the GPS device 14, that is, the mobile terminal apparatus 1.

The direction detection device 15 includes a gyro sensor, an electronic compass, or the like, and detects an orientation (direction) of the mobile terminal apparatus 1.

The storage device 16 is a non-volatile storage device such as a flash memory, and stores programs and data. The storage device 16 stores an output instruction program 16a. The storage device 16 is a non-transitory tangible storage medium in which the output instruction program is stored.

The calculation processing device 17 is a computer that includes a CPU (Central Processing Unit), a ROM (Read Only Memory), a RAM (Random Access Memory), and the like, and loads a program from the storage device 16 or the ROM into the RAM and executes the program, to implement various processing portions.

In the present embodiment, by the calculation processing device 17 executing the output instruction program 16a, a device detection portion 21, a map image generation portion 22, a user interface portion 23, and an output instruction portion 24 are implemented.

The device detection portion 21 detects the image forming apparatuses 2 that can be used by the mobile terminal apparatus 1, by using the wireless communication device 11. For example, a wireless LAN (Local Area Network) is established for each floor, and the image forming apparatuses 2 that are connected to the wireless LAN for the corresponding floor and that are in a power-on state, are detected by the device detection portion 21.

The map image generation portion 22 obtains positional information of the image forming apparatuses 2 having been detected, from the image forming apparatuses 2 by using the wireless communication device 11, to generate a map image. In the map image, device icons representing the image forming apparatuses 2 are disposed to indicate a distance and a direction of each image forming apparatus 2, relative to the present position and the present orientation of the mobile terminal apparatus 1, based on the present position and the present orientation of the mobile terminal apparatus 1, and the positional information of the image forming apparatuses 2.

The user interface portion 23 causes the display device 12 to display the map image, and identifies the image forming apparatus corresponding to a device icon that is selected from among the device icons in the map image by a user operating the input device 13.

The output instruction portion 24 transmits, for example, an output instruction including document data, to the image forming apparatus corresponding to the device icon selected from among the device icons in the map image displayed on the display device 12.

In Embodiment 1, the map image generation portion 22 disposes, in the map image, a document icon representing a document to be outputted according to the output instruction. The user interface portion 23 detects, as a user's operation, a flicking operation of flicking the document icon, and identifies the image forming apparatus 2 corresponding to a device icon selected by the flicking operation.

Further, in Embodiment 1, the map image generation portion 22 can operate in an AR (Augmented Reality) mode in which the device icons are disposed so as to be superimposed on an image taken by the imaging device 18 at the moment, to generate the map image. The imaging device 18 includes an imaging element such as a CCD (Charge Coupled Device), and generates image data of a taken image according to an output from the imaging element.

When a predetermined operation by a user is detected, the map image generation portion 22 switches a display mode between the AR mode and a two-dimensional mode (in which the device icons and the document icon are disposed on a plane, to generate a map image).

Figure 3:
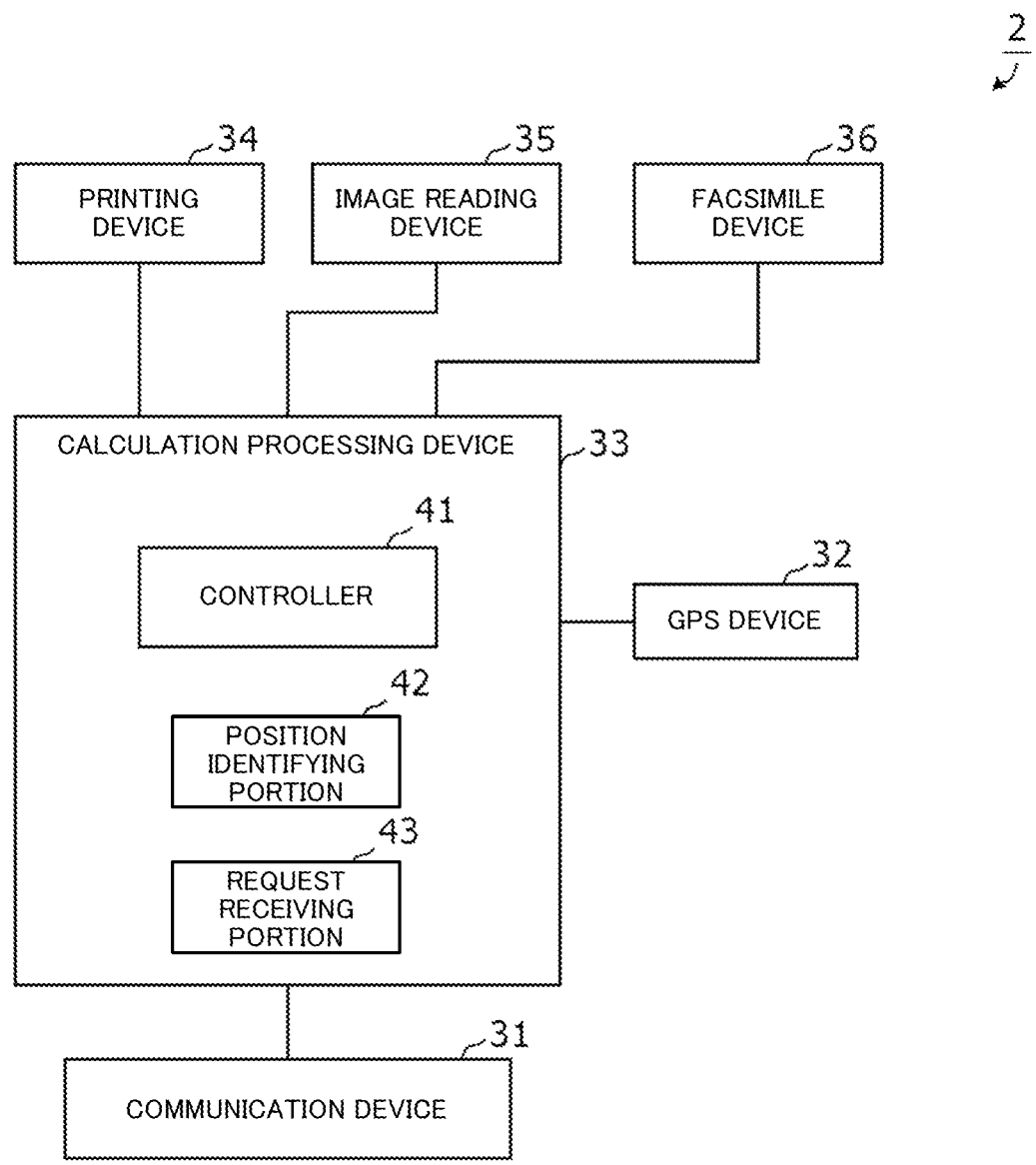
FIG. 3 is a block diagram illustrating a configuration of an image forming apparatus 2 shown in FIG. 1.

FIG. 3 is a block diagram illustrating a configuration of the image forming apparatus 2 shown in FIG. 1.

The image forming apparatus 2 shown in FIG. 1 includes a communication device 31, a GPS device 32, a calculation processing device 33, a printing device 34, an image reading device 35, a facsimile device 36, and the like.

The communication device 31 is a network interface or the like, and performs data communication with the mobile terminal apparatus 1.

The GPS device 32 detects a present position of the image forming apparatus 2.

The calculation processing device 33 is a computer that includes a CPU, a ROM, and a RAM, and loads, into the RAM, a program stored in the ROM or a not-illustrated storage device and causes the CPU to execute the program, thereby implementing various processing portions.

In the calculation processing device 33, a controller 41, a position identifying portion 42, and a request receiving portion 43 are implemented.

The controller 41 controls internal devices such as the printing device 34, the image reading device 35, and the facsimile device 36, to execute various processes.

The printing device 34 prints, for example, an image based on document data received from the mobile terminal apparatus 1. The image reading device 35 optically reads a document image from a document, and generates image data of the document image. The facsimile device 36 generates and transmits a facsimile signal representing, for example, an image based on the document data received from the mobile terminal apparatus 1, and receives a facsimile signal from the outside and generates an image from the facsimile signal.

The position identifying portion 42 obtains information of the present position of the image forming apparatus 2 by using the GPS device 32.

According to Embodiment 1, the image forming apparatus 2 includes the GPS device 32. However, in a case where the image forming apparatus 2 does not include the GPS device 32, positional information of the image forming apparatus 2 may be previously stored in a not-illustrated storage device, and the position identifying portion 42 may read, from the storage device, the positional information as the information of the present position of the image forming apparatus 2.

The request receiving portion 43 receives various requests such as an output instruction and a request for transmitting the positional information. In response to the request for transmitting the positional information, the request receiving portion 43 transmits the information of the present position of the image forming apparatus 2 as is obtained by the position identifying portion 42. When receiving the output instruction, the request receiving portion 43 transfers the output instruction to the controller 41, and causes the controller 41 to execute a process designated by the output instruction.

Figure 4:
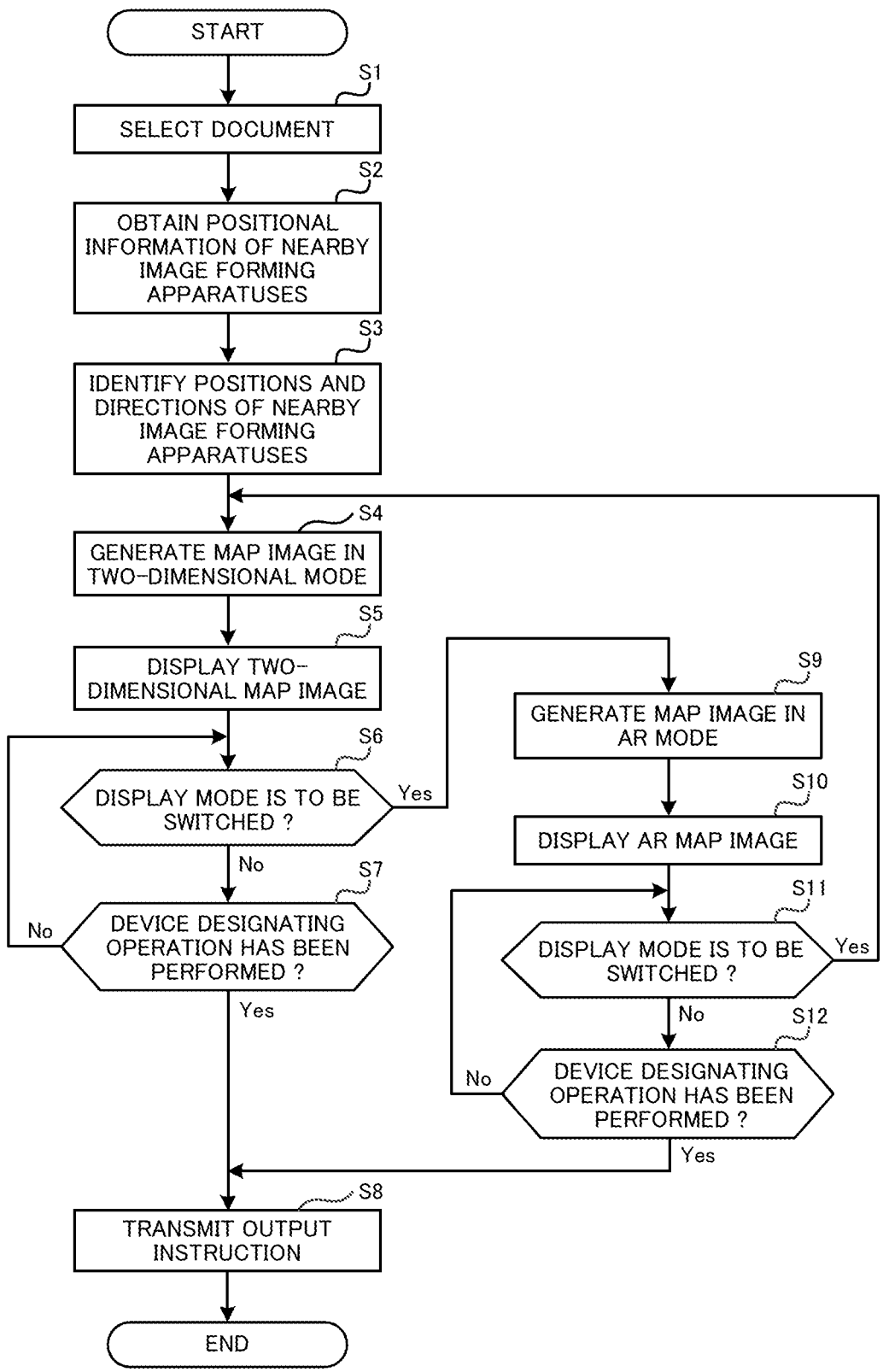
FIG. 4 is a flow chart showing an operation of the mobile terminal apparatus 1 in the system shown in FIG. 1.

Next, an operation of the mobile terminal apparatus 1 in the system will be described. FIG. 4 is a flow chart showing an operation of the mobile terminal apparatus 1 in the system shown in FIG. 1.

A user operates the mobile terminal apparatus 1 to select document data to be used for image output and selects from among the image forming apparatuses 2. Then, the mobile terminal apparatus 1 is caused to transmit, to the image forming apparatus 2, an output instruction for outputting the document data.

Firstly, when the user selects the document data to be used for image output by operating the input device 13, the user interface portion 23 causes the display device 12 to display an image based on the selected document data (step S1).

Figure 5:
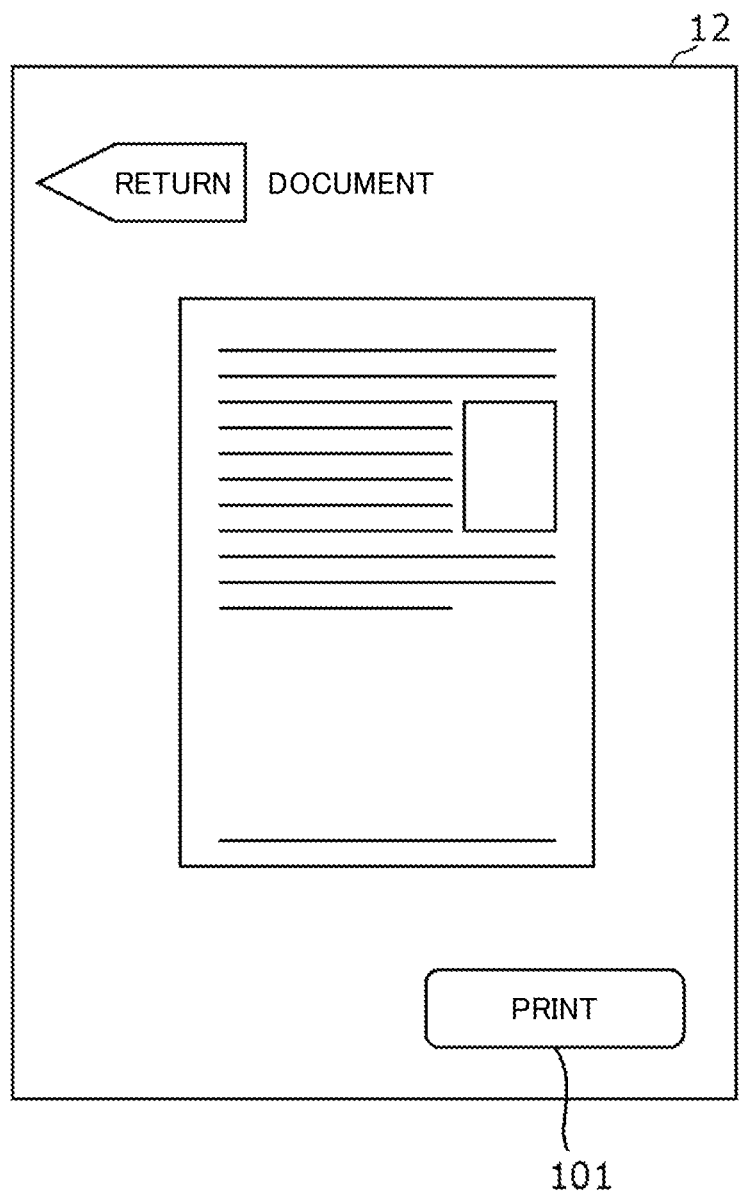
FIG. 5 illustrates an exemplary screen on which an image based on document data is displayed.

FIG. 5 illustrates an exemplary screen on which the image based on the document data is displayed. As shown in FIG. 5, a print key 101 is displayed on the screen.

When the user presses the print key 101, the document data which is selected at the moment is set as document data to be used for image output.

When the document data to be used for image output is determined, the device detection portion 21 searches for the image forming apparatuses 2 that can be used at the moment, by using the wireless communication device 11.

The map image generation portion 22 obtains, from the image forming apparatuses 2, the positional information of the image forming apparatuses 2 that have been found by the device detection portion 21, by using the wireless communication device 11 (step S2), and identifies a position and direction of each image forming apparatus 2 relative to the mobile terminal apparatus 1, based on the obtained positional information and the present position and orientation of the mobile terminal apparatus 1 (step S3).

The map image generation portion 22 generates a map image in the two-dimensional mode (step S4), and the user interface portion 23 causes the display device 12 to display the generated map image (step S5).

Figure 6:
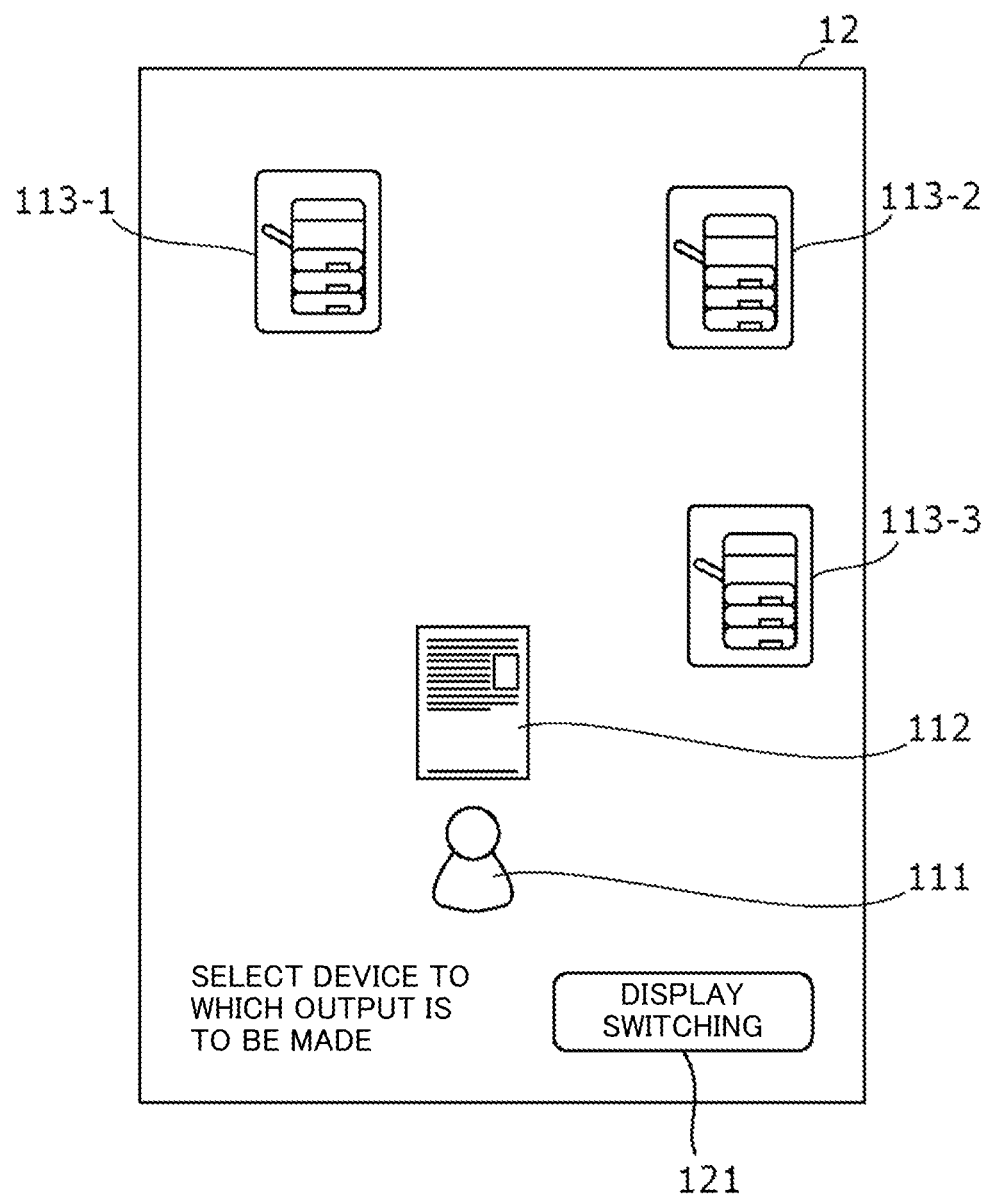
FIG. 6 illustrates an exemplary screen on which a map image is displayed in a two-dimensional mode.

FIG. 6 illustrates an exemplary screen on which the map image is displayed in the two-dimensional mode. As shown in FIG. 6, a user icon 111 representing the user, a document icon 112 representing the document data, and device icons 113-1 to 113-3 corresponding to the image forming apparatuses 2 having been found, are displayed as the map image on the screen.

Further, as shown in FIG. 6, a display switching key 121 by which a display mode is switched between the two-dimensional mode and the AR mode is displayed on the screen.

The positions of the device icons 113-1 to 113-3 are determined based on positions and directions of the image forming apparatuses 2, respectively, relative to the mobile terminal apparatus 1. Therefore, each time the position and orientation of the mobile terminal apparatus 1 are changed by the user, the map image is updated. However, the positions at which the user icon 111, the document icon 112, and the display switching key 121 are displayed need not be changed.

Therefore, in a state where the screen is displayed, a device designating operation of designating the image forming apparatus 2 to be used for image output, and a pressing operation of pressing the display switching key 121 can be performed, and the user interface portion 23 checks whether or not the above operations have been performed (step S6, step S7).

The device designating operation includes (1) an operation of dragging and dropping the document icon 112 onto the device icon 113-i (i=1, 2, 3) to be selected by the user, and (2) a flicking operation of flicking the document icon 112 toward the device icon 113-i to be selected by the user.

In the case of the drag and drop operation, the user interface portion 23 sequentially changes a position at which the document icon 112 is displayed, to a position designated by the user. When the document icon 112 has been superimposed on the device icon 113-i, it is determined at that point in time that the device icon 113-i has been designated.

In the case of the flicking operation, the user interface portion 23 determines whether or not any one of the device icons 113-i is positioned in the flicking direction. When any one of the device icons 113-i is positioned, it is determined that the one of the device icons 113-i has been designated, and a position at which the document icon 112 is displayed is changed so as to move along the flicking direction.

When the above-described device designating operation is detected, the output instruction portion 24 transmits, to the image forming apparatus 2 having been designated, an output instruction for outputting the document, by using the wireless communication device 11 (step S8).

Figure 7:
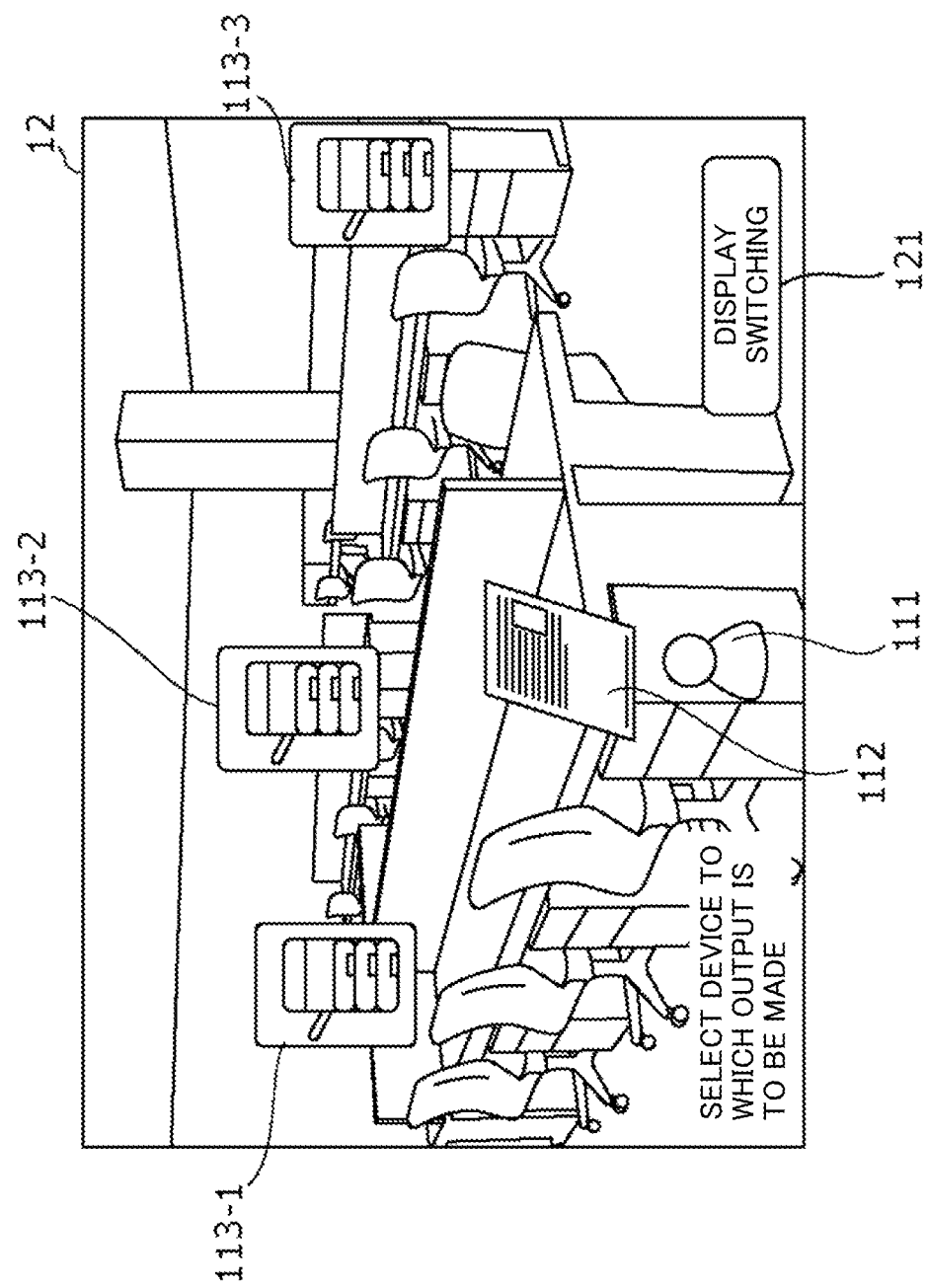
FIG. 7 illustrates an exemplary screen on which a map image is displayed in an AR mode.

On the other hand, when a pressing operation of pressing the display switching key 121 is detected, the user interface portion 23 switches the display mode to the AR mode, and generates a map image in the AR mode (step S9), to cause the display device 12 to display the map image (step S10). FIG. 7 illustrates an exemplary screen on which the map image is displayed in the AR mode. As shown in FIG. 7, in the AR mode, the user icon 111, the document icon 112, the device icons 113-1 to 113-3, and the display switching key 121 are superimposed on an image taken by the imaging device 18.

In the AR mode, for example, the field of view of the imaging device 18 is determined based on, for example, an angle by which the mobile terminal apparatus 1 is tilted, and positions, in the field of view (that is, in the taken image) of the imaging device 18, at which the image forming apparatuses 2 are positioned, are identified to superimpose the device icons 113-i at the positions.

Similarly in the AR mode, the user interface portion 23 checks whether or not the device designating operation or a pressing operation of pressing the display switching key 121 has been performed (step S11, step S12).

When, in the AR mode, the pressing operation of pressing the display switching key 121 has been performed (step S11), the mode is returned to the two-dimensional mode.

On the other hand, when the device designating operation has been detected (step S12), the output instruction portion 24 transmits, to the image forming apparatus 2 having been designated, an output instruction for outputting the document, by using the wireless communication device 11 (step S8).

As described above, according to Embodiment 1, a relationship representing a relative position (distance and direction) between the document icon 112 and each of the device icons 113-1 to 113-3, is displayed on the display device 12 of the mobile terminal apparatus 1 so as to represent an actual relationship of a relative position (distance and direction) between the user's present position and each of the image forming apparatuses 2. Therefore, a user is allowed to intuitively select a desired image forming apparatus.

Embodiment 2

In an image forming system according to Embodiment 2 of the present disclosure, when a plurality of device icons positioned so as to be close to each other are selected in the device designating operation as described above, the user interface portion 23 of the mobile terminal apparatus 1 operates to display an enlarged image including the plurality of device icons, and specifies, as the image forming apparatus 2 to be used for image output, the image forming apparatus 2 corresponding to a device icon that is reselected, in the device designating operation, from among the device icons in the enlarged image.

Figure 8:
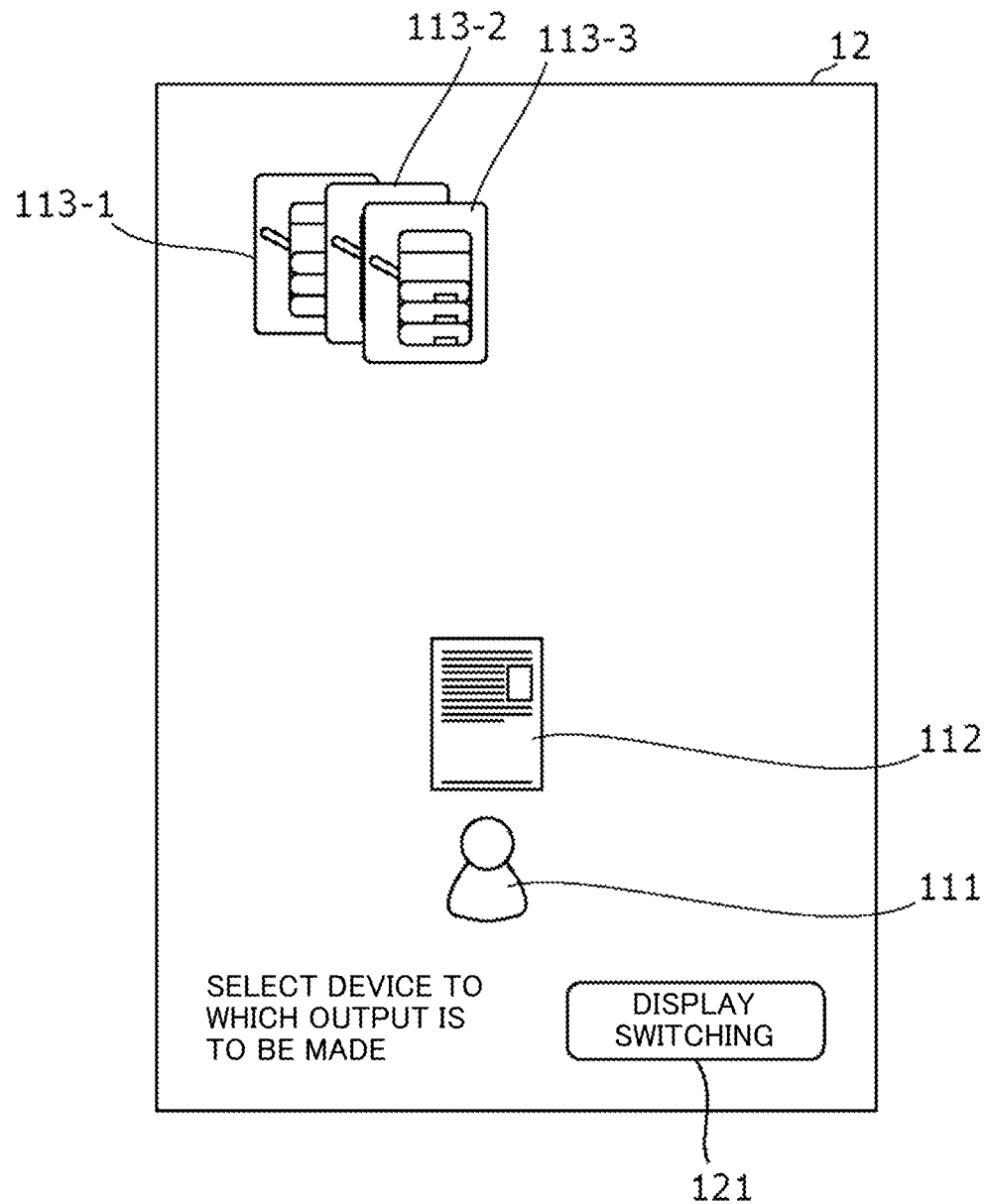
FIG. 8 illustrates an exemplary screen on which three device icons 113-1 to 113-3 are displayed so as to be close to each other in the two-dimensional mode.

FIG. 8 illustrates an exemplary screen on which three device icons 113-1 to 113-3 are displayed so as to be close to each other in the two-dimensional mode.

When a device icon is designated in the flicking operation, the user interface portion 23 determines whether or not the number of the device icons 113-i in a predetermined angular range in the flicking direction is plural. When the number of the device icons 113-i in the predetermined angular range in the flicking direction, is one, the image forming apparatus 2 corresponding to the device icon 113-i is selected as the image forming apparatus 2 to be used for image output. When the number of the device icons 113-i in the predetermined angular range in the flicking direction is plural, the display device 12 is caused to display an enlarged image including the device icons 113-i.

Figure 9:
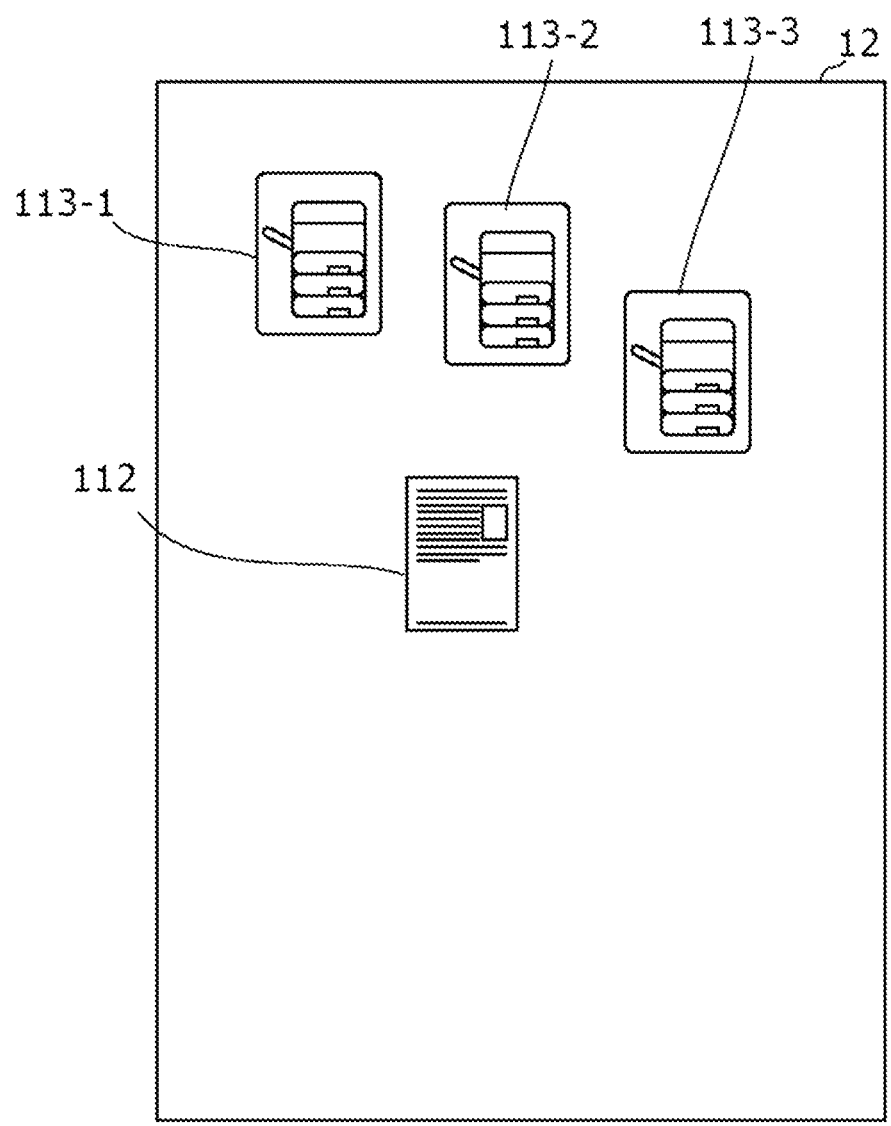
FIG. 9 illustrates an exemplary screen on which an enlarged image is displayed in the two-dimensional mode.

FIG. 9 illustrates an exemplary screen on which the enlarged image is displayed in the two-dimensional mode. As shown in FIG. 9, the enlarged image is displayed so as to enlarge distances among the device icons 113-i.

When the user performs the device designating operation again, the user interface portion 23 selects, as the image forming apparatus 2 to be used for image output, the image forming apparatus 2 corresponding to the device icon 113-i which is designated in the device designating operation.

Figure 10:
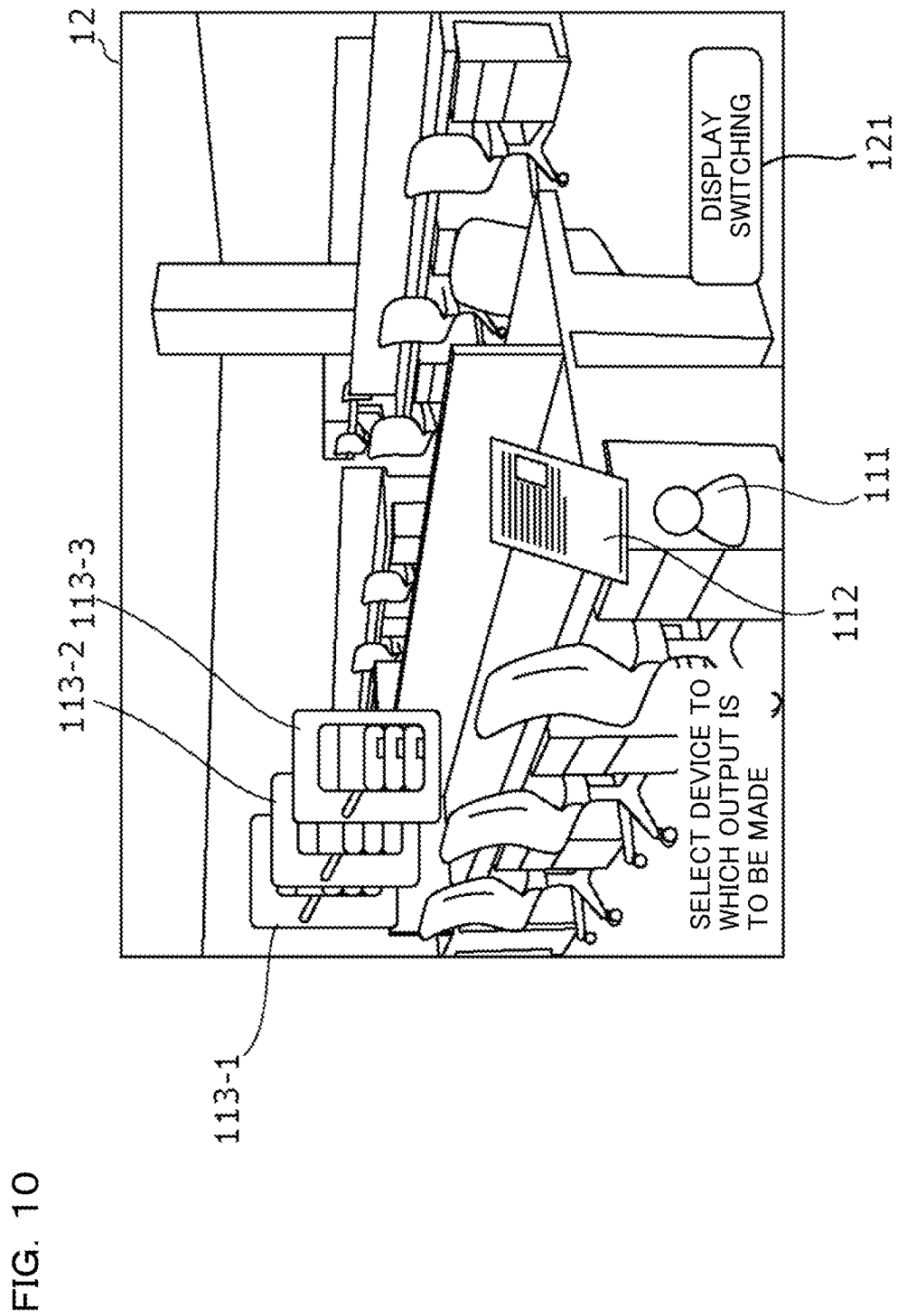
FIG. 10 illustrates an exemplary screen on which the three device icons 113-1 to 113-3 are displayed so as to be close to each other in the AR mode.
Figure 11:
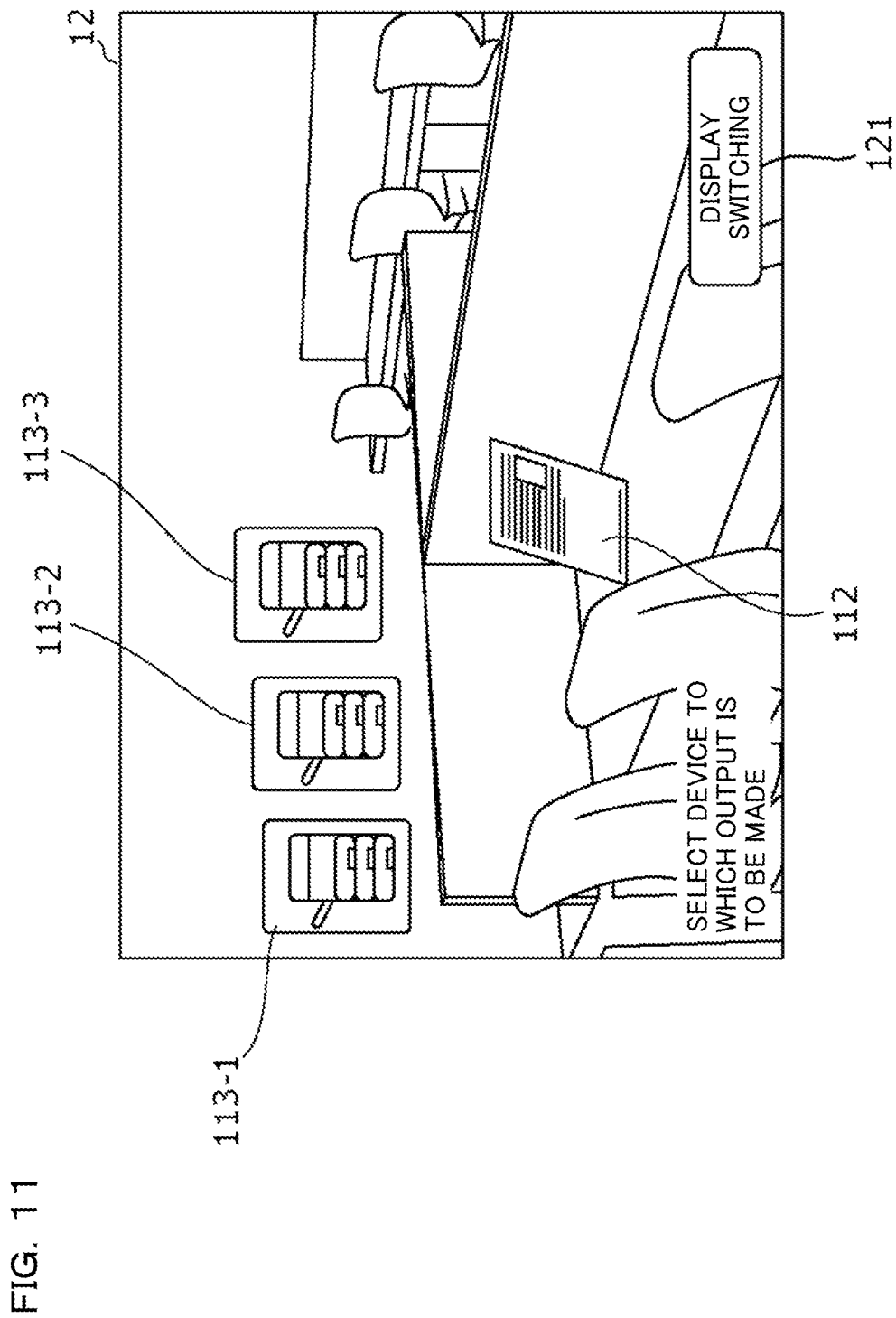
FIG. 11 illustrates an exemplary screen on which an enlarged image is displayed in the AR mode.

FIG. 10 illustrates an exemplary screen on which the three device icons 113-1 to 113-3 are displayed so as to be close to each other in the AR mode. FIG. 11 illustrates an exemplary screen on which the enlarged image is displayed in the AR mode.

Also in the AR mode, as shown in FIG. 10, when the plurality of device icons 113-1 to 113-3 are positioned so as to be close to each other, and any of the device icons 113-1 to 113-3 is designated, the enlarged image is displayed as shown in FIG. 11.

Figure 12:
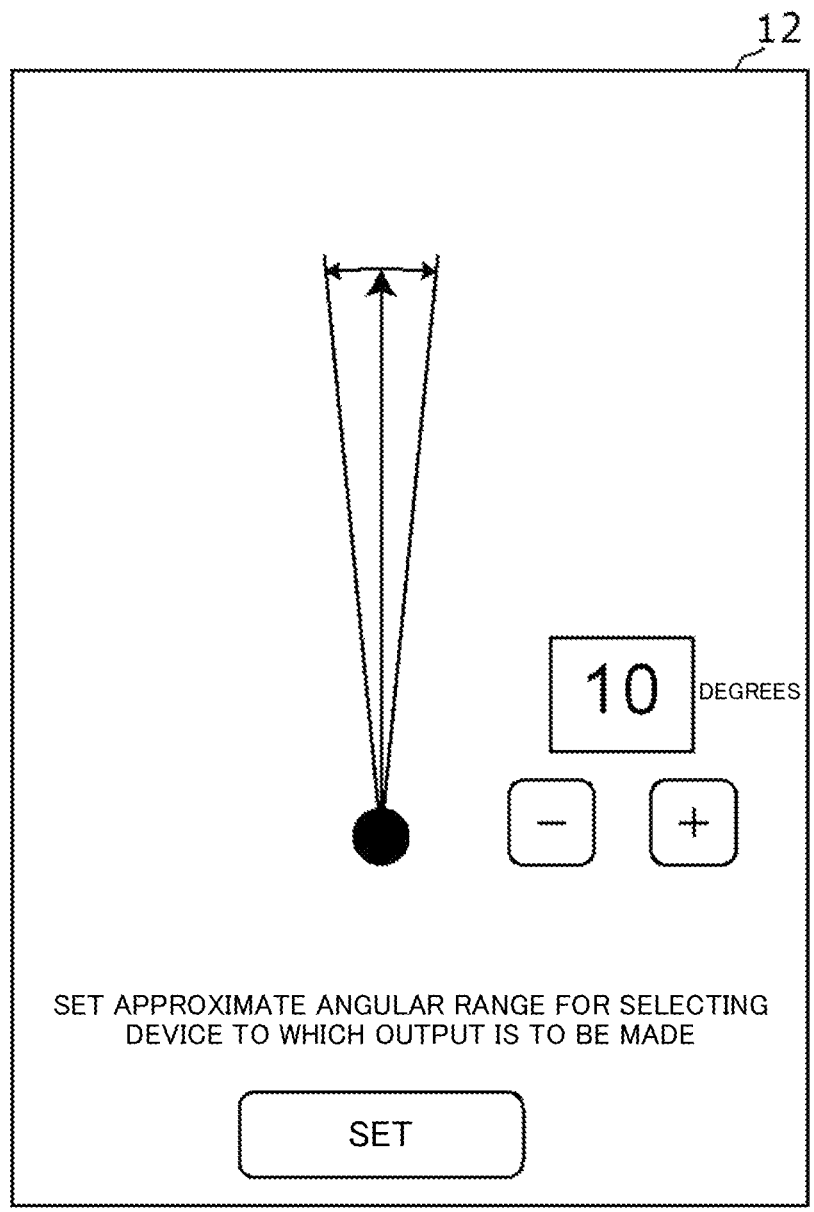
FIG. 12 illustrates an exemplary angular range setting screen.

The angular range as described above can be set on a setting screen. FIG. 12 illustrates an exemplary angular range setting screen. A user is allowed to adjust the angular range as described above, by inputting a set value (10 degrees in FIG. 12) of the angular range on the setting screen as shown in FIG. 12.

Other configuration and operation of each device in Embodiment 2 are the same as described for Embodiment 1, and the description thereof is not given.

As described above, according to Embodiment 2, also when the plurality of device icons 113-1 to 113-3 are displayed so as to be close to each other, the device icon 113-i corresponding to the image forming apparatus 2 desired by a user is correctly selected.

The above embodiments are preferred embodiments of the present disclosure. However, the present disclosure is not limited to the above embodiments. Various modifications and changes can be made without departing from the gist of the present disclosure.

Figure 13:
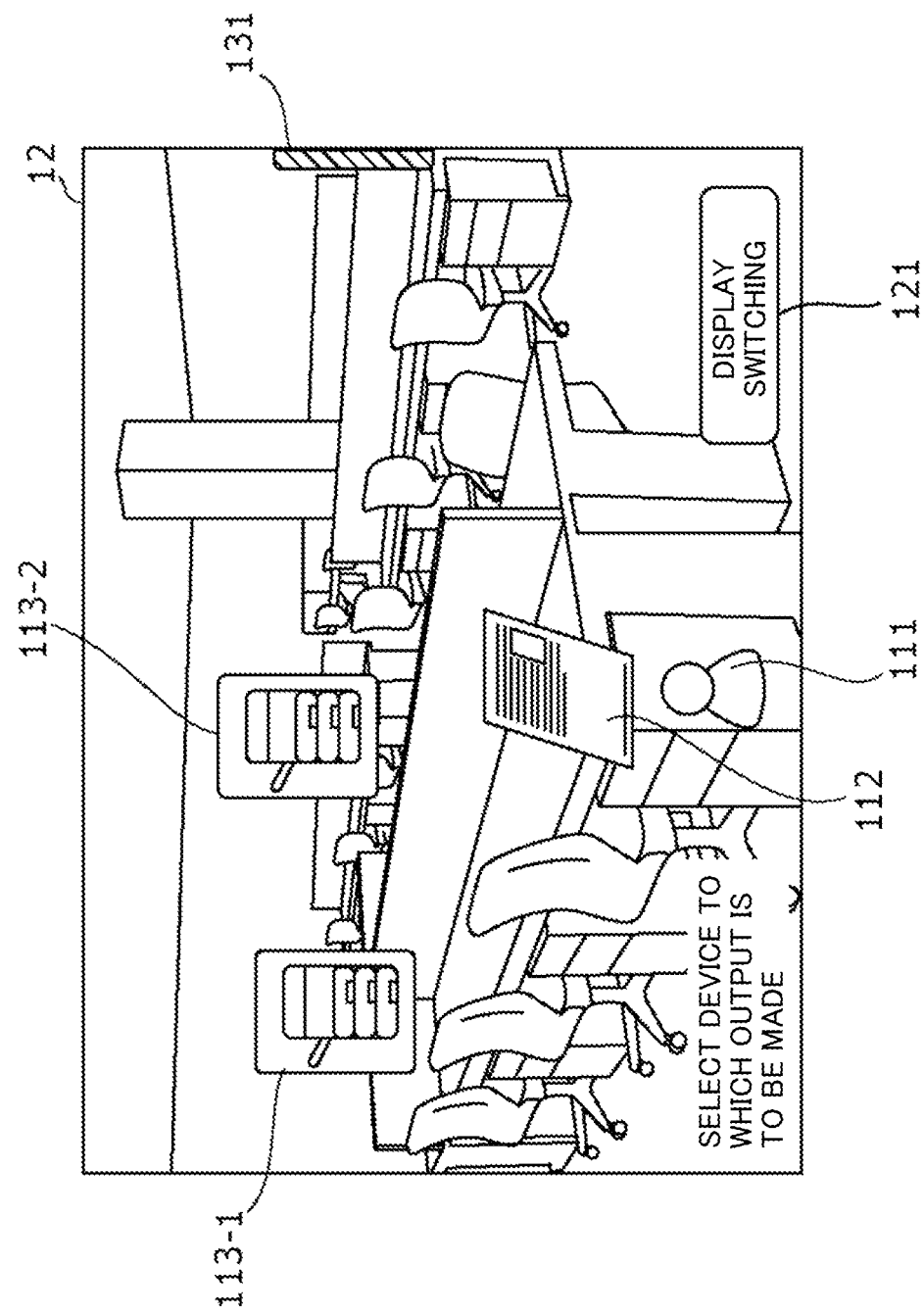
FIG. 13 illustrates an example of an edge image.

For example, in each of the above embodiments, the map image generation portion 22 may operate to display a map image that includes, in an edge portion of the map image, an edge image representing a direction in which an image forming apparatus of which the device icon is not displayed in the map image is positioned, so as to correspond to the image forming apparatus 2 which is included in the image forming apparatuses 2 having been detected by the device detection portion 21 and of which the device icon 113-i is not displayed in the map image. FIG. 13 illustrates an example of the edge image. In this case, an edge image 131 as shown in FIG. 13 may be displayed.

Further, in each of the above embodiments, when the image forming apparatus 2 to which an output instruction is to be transmitted, is previously determined, the map image generation portion 22 may display an animation in which the document icon 112 is being moved, in the map image, toward the device icon 113-i of the image forming apparatus 2 to which the output instruction is to be transmitted.

The present disclosure is applicable to, for example, a network system in which a plurality of image forming apparatus are connected.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image forming system comprising:
   one or plural image forming apparatuses; and
   a mobile terminal apparatus configured to transmit an output instruction to any of the one or plural image forming apparatuses, wherein
   each image forming apparatus transmits, when receiving, from the mobile terminal apparatus, a request for transmitting positional information of the image forming apparatus, the positional information of the image forming apparatus to the mobile terminal apparatus, and the mobile terminal apparatus includes:
- a display device;
- a position detection device configured to detect a present position of the mobile terminal apparatus;
- a direction detection device configured to detect a present orientation of the mobile terminal apparatus;
- a wireless communication device;
- a device detection portion configured to detect the image forming apparatuses that can be used, by using the wireless communication device;
- a map image generation portion configured to obtain the positional information of the image forming apparatuses having been detected, from the image forming apparatuses having been detected, and generate a map image that indicates, by disposing device icons representing the image forming apparatuses having been detected, a distance and a direction of each image forming apparatus having been detected, relative to the present position and the present orientation of the mobile terminal apparatus, based on the present position and the present orientation of the mobile terminal apparatus and the positional information of the image forming apparatuses having been detected;
- an output instruction portion configured to transmit the output instruction, to the image forming apparatus corresponding to a device icon selected from among the device icons in the map image displayed on the display device;
- an imaging device;
- an input device; and
- a user interface portion configured to cause the display device to display the map image, and identify the image forming apparatus corresponding to the device icon selected, by a flicking operation performed on the input device, from among the device icons in the map image, wherein
  the map image generation portion disposes, at positions in a field of view of the imaging device at which the image forming apparatuses are positioned, the device icons so as to superimpose the device icons on an image taken by the imaging device at the moment, disposes a user icon representing the user at a position in the field of view of the imaging device at which the user is positioned so as to superimpose the user icon on the image taken by the imaging device at the moment, and generates the map image,
- when a plurality of the device icons are positioned in a predetermined angular range in a direction of the flicking operation, the user interface portion operates to display an enlarged image including the plurality of the device icons, and
- the output instruction portion specifies, as an image forming apparatus to be used for image output, an image forming apparatus corresponding to the device icon selected, by a user's operation performed on the input device, from among the plurality of the device icons in the enlarged image.

2. The image forming system according to claim 1, wherein the map image generation portion disposes, in the map image, a document icon representing a document to be outputted according to the output instruction, and
the user interface portion detects a flicking operation performed on the document icon as the user's operation, and identifies the image forming apparatus corresponding to the device icon selected by the flicking operation.

3. The image forming system according to claim 1, wherein the map image generation portion (a) disposes, in the map image, a document icon representing a document to be outputted according to the output instruction, and
(b) moves, when the image forming apparatus to which the output instruction is to be transmitted has been already determined, the document icon in the map image toward the device icon representing the image forming apparatus to which the output instruction is to be transmitted.

4. The image forming system according to claim 1, wherein the map image generation portion disposes, when a predetermined operation by a user is detected, the device icons so as to superimpose the device icons on the image taken by the imaging device at the moment, and generates the map image.

5. The image forming system according to claim 1, wherein the map image generation portion operates to display a map image that includes, in an edge portion along a margin of the map image, an image disposed along the edge portion abutting the margin of the map image and representing a direction in which the image forming apparatus of which the device icon is not displayed in the map image is positioned, so as to correspond to the image forming apparatus which is included in the image forming apparatuses having been detected and of which the device icon is not displayed in the map image.

6. A non-transitory computer-readable storage medium having stored therein an output instruction program by which a computer in a mobile terminal apparatus that includes: a display device; a position detection device configured to detect a present position; a direction detection device configured to detect a present orientation; and a wireless communication device, and that transmits an output instruction to image forming apparatuses, is caused to function as:
- a device detection portion configured to detect the image forming apparatuses that can be used, by using the wireless communication device;
- a map image generation portion configured to obtain positional information of the image forming apparatuses having been detected, from the image forming apparatuses having been detected, and generate a map image that indicates, by disposing device icons representing the image forming apparatuses having been detected, a distance and a direction of each image forming apparatus having been detected, relative to the present position and the present orientation of the mobile terminal apparatus, based on the present position and the present orientation of the mobile terminal apparatus and the positional information of the image forming apparatuses having been detected;
- an output instruction portion configured to transmit the output instruction, to the image forming apparatus corresponding to a device icon selected from among the device icons in the map image displayed on the display device; and
- an imaging device,
- the mobile terminal apparatus further including an input device, and
- the computer being caused to further function as a user interface portion configured to cause the display device to display the map image, and identify the image forming apparatus corresponding to the device icon selected, by a flicking operation performed on the input device, from among the device icons in the map image, wherein
  the map image generation portion disposes, at positions in a field of view of the imaging device at which the image forming apparatuses are positioned, the device icons so as to superimpose the device icons on an image taken by the imaging device at the moment, disposes a user icon representing the user at a position in the field of view of the imaging device at which the user is positioned so as to superimpose the user icon on the image taken by the imaging device at the moment, and generates the map image, when a plurality of the device icons are positioned in a predetermined angular range in a direction of the flicking operation, the user interface portion operates to display an enlarged image including the plurality of the device icons, and the output instruction portion specifies, as an image forming apparatus to be used for image output, an image forming apparatus corresponding to the device icon selected, by a user's operation performed on the input device, from among the plurality of the device icons in the enlarged image.

7. The non-transitory computer-readable storage medium having stored therein the output instruction program according to claim 6, wherein the map image generation portion disposes, in the map image, a document icon representing a document to be outputted according to the output instruction, and the user interface portion detects a flicking operation performed on the document icon as the user's operation, and identifies the image forming apparatus corresponding to the device icon selected by the flicking operation.

8. The non-transitory computer-readable storage medium having stored therein the output instruction program according to claim 6, wherein the map image generation portion (a) disposes, in the map image, a document icon representing a document to be outputted according to the output instruction, and (b) moves, when the image forming apparatus to which the output instruction is to be transmitted has been already determined, the document icon in the map image toward the device icon representing the image forming apparatus to which the output instruction is to be transmitted.

9. The non-transitory computer-readable storage medium having stored therein the output instruction program according to claim 6, wherein the mobile terminal apparatus further includes an imaging device, and the map image generation portion disposes the device icons so as to superimpose the device icons on an image taken by the imaging device at the moment, and generates the map image.

10. The non-transitory_computer-readable storage medium having stored therein the output instruction program according to claim 9, wherein the map image generation portion disposes, when a predetermined operation by a user is detected, the device icons so as to superimpose the device icons on the image taken by the imaging device at the moment, and generates the map image.

11. The non-transitory computer-readable storage medium having stored therein the output instruction program according to claim 6, wherein the map image generation portion operates to display a map image that includes, in an edge portion along a margin of the map image, an image disposed along the edge portion abutting the margin of the map image and representing a direction in which the image forming apparatus of which the device icon is not displayed in the map image is positioned, so as to correspond to the image forming apparatus which is included in the image forming apparatuses having been detected and of which the device icon is not displayed in the map image.

* * * * *